(12) United States Patent
Yamaguchi

(10) Patent No.: US 11,255,134 B2
(45) Date of Patent: Feb. 22, 2022

(54) THREADED JOINT FOR OIL COUNTRY TUBULAR GOODS

(71) Applicant: JFE Steel Corporation, Tokyo (JP)

(72) Inventor: Masao Yamaguchi, Aichi (JP)

(73) Assignee: JFE Steel Corporation, Tokyo (JP)

( * ) Notice: Subject to any disclaimer, the term of this patent is extended or adjusted under 35 U.S.C. 154(b) by 220 days.

(21) Appl. No.: 16/323,871

(22) PCT Filed: Jul. 20, 2017

(86) PCT No.: PCT/JP2017/026245
§ 371 (c)(1),
(2) Date: Feb. 7, 2019

(87) PCT Pub. No.: WO2018/037781
PCT Pub. Date: Mar. 1, 2018

(65) Prior Publication Data
US 2019/0211631 A1    Jul. 11, 2019

(30) Foreign Application Priority Data
Aug. 24, 2016  (JP) .............................. JP2016-163959

(51) Int. Cl.
*E21B 17/042*    (2006.01)
*F16L 15/04*    (2006.01)
(Continued)

(52) U.S. Cl.
CPC .......... *E21B 17/042* (2013.01); *F16L 15/001* (2013.01); *F16L 15/04* (2013.01); *F16L 15/06* (2013.01)

(58) Field of Classification Search
CPC ........ F16L 15/06; F16L 15/001; E21B 17/042
(Continued)

(56) References Cited

U.S. PATENT DOCUMENTS 3,870,351 A    3/1975  Matsuki
4,384,737 A    5/1983  Reusser
(Continued)

FOREIGN PATENT DOCUMENTS

EP    0916883 A1    5/1999
GB    2479259 A    10/2011
(Continued)

OTHER PUBLICATIONS

Australian Examination Report for Australian Application No. 2017316876, dated Mar. 13, 2019, 3 pages.
(Continued)

*Primary Examiner* — Zachary T Dragicevich
(74) *Attorney, Agent, or Firm* — RatnerPrestia

(57) ABSTRACT

A threaded joint includes: a pin having an annular outer peripheral surface portion formed on a tip end side of a steel pipe, and an externally-threaded portion formed from the annular outer peripheral surface portion toward a center of a steel pipe in an axial direction of the steel pipe; and a box having a cavity in which the pin is housed, wherein an internally-threaded portion which threadedly engages with the externally-threaded portion and an annular inner peripheral surface portion which is brought into contact with and abuts against the annular outer peripheral surface portion are formed in the cavity, wherein the pin and the box are joined to each other due to threaded engagement between the externally-threaded portion and the internally-threaded portion.

6 Claims, 3 Drawing Sheets

(51) Int. Cl.
*F16L 15/00* (2006.01)
*F16L 15/06* (2006.01)

(58) Field of Classification Search
USPC .................................................. 285/333, 334
See application file for complete search history.

(56) References Cited

U.S. PATENT DOCUMENTS

| 4,732,416 | A | 3/1988 | Dearden et al. | |
|---|---|---|---|---|
| 8,973,953 | B2* | 3/2015 | Hignett | F16L 15/00 285/333 |
| 2004/0108719 | A1* | 6/2004 | Carcagno | E21B 17/042 285/333 |
| 2007/0132236 | A1* | 6/2007 | Dubedout | F16L 15/004 285/333 |
| 2013/0181442 | A1* | 7/2013 | Sonobe | F16L 15/06 285/333 |
| 2015/0001841 | A1* | 1/2015 | Oshima | E21B 17/042 285/334 |
| 2016/0186899 | A1* | 6/2016 | Besse | E21B 17/042 |

FOREIGN PATENT DOCUMENTS

| JP | 4899716 | A | 12/1973 |
|---|---|---|---|
| JP | 60260792 | A | 12/1985 |
| JP | 2005308201 | A | 11/2005 |

OTHER PUBLICATIONS

Japanese Office Action for Japanese Application No. 2017-550261, dated Nov. 6, 2018, with Concise Statement of Relevance of Office Action, 4 pages.
European Communication pursuant to Article 94(3) for European Application No. 17 843 268.8, dated Aug. 10, 2020, 4 pages.
Extended European Search Report for European Application No. 17843268.8, dated Jul. 22, 2019, 7 pages.
International Search Report and Written Opinion for International Application No. PCT/JP2017/026245, dated Sep. 12, 2017—6 pages.
Chinese Office Action for Chinese Application No. 201710730007.2, dated Apr. 10, 2020, with Concise Statement of Relevance of Office Action, 5 pages.
Chinese Office Action for Chinese Application No. 201710730007.2, dated Sep. 17, 2019 with Concise Statement of Relevance of Office Action, 9 pages.
Chinese Office Action for Chinese Application No. 201710730007.2, dated Jan. 29, 2021, with Concise Statement of Relevance of Office Action, 5 pages.
Chinese Office Action for Chinese Application No. 201710730007.2, dated Jul. 9, 2021 with Concise Statement of Relevance of Office Action, 5 pages.
Japanese Office Action for Japanese Application No. 2019-145426, dated Aug. 24, 2021, with Concise Statement of Relevance of Office Action, 9 pages.

* cited by examiner

A
Prior Art

SEE FIG. 3C   SEE FIG. 3B

THREADED JOINT FOR OIL COUNTRY TUBULAR GOODS

CROSS REFERENCE TO RELATED APPLICATIONS

This is the U.S. National Phase application of PCT/JP2017/026245, filed Jul. 20, 2017, which claims priority to Japanese Patent Application No. 2016-163959, filed Aug. 24, 2016, the disclosures of these applications being incorporated herein by reference in their entireties for all purposes.

FIELD OF THE INVENTION

The present invention relates to a threaded joint for oil country tubular goods having excellent sealability which is optimum for connection of oil country tubular goods used for search of an oil well or a gas well and production of oil and gas in general.

BACKGROUND OF THE INVENTION

Threaded joints for pipes have been popularly used for connecting steel pipes used in petroleum installations of an oil industry such as oil country tubular goods. In connecting steel pipes used for search and production of oil or gas, conventionally, a standard threaded joint which is stipulated in API (American Petroleum Institute) standard has been typically used. However, recently, deepening of a well for crude oil or a natural gas has been in progress and the number of horizontal wells and directional wells from vertical wells has been increasing and hence, the drilling and production environment has become severe. Further, the number of wells developed in an extremely severe environment such as oceans and polar regions has been increasing and hence, the performances which threaded joints have to satisfy are diversified including compression resistance, bending resistance, sealability (external pressure resistance). In view of the above, the number of cases where a special threaded joint having high performances which is referred to as "premium joint" is used has increased, and a demand for the improvement in performance of the premium joint has been also steadily increased. A premium joint is usually a coupling-type joint where an externally-threaded member and an internally-threaded member respectively having tapered threads, a metal touch seal portion (hereinafter, also referred to as "seal portion") and a torque shoulder portion (hereinafter, also referred to as shoulder portion) on corresponding pipes are joined to each other. The tapered threads are important for firmly fixing the pipe joint. The metal touch at seal portion plays a role of ensuring sealability by bringing the internally-threaded member (hereinafter, referred to as "box") and the externally-threaded member (hereinafter, referred to as "pin") into contact with each other, and torque shoulder portions form shoulder faces which function as abutments during tightening the joint. FIG. 3A, FIG. 3B and FIG. 3C are views for schematically describing a premium joint for oil country tubular goods of a coupling type.

FIG. 3A to FIG. 3C are also cross-sectional views of a threaded joint for a circular pipe in a pipe axial direction, which schematically explain a coupling-type premium joint for oil country tubular goods. The threaded joint includes pins 1 and a box 2 which corresponds to the pins. The pin 1 has an externally-threaded portion 4 on an outer surface thereof, and a non-threaded portion referred to as a nose portion 5 on a tip end thereof adjacent to the externally-threaded portion 4. The nose portion 5 has a metal touch seal portion 7 on an outer peripheral surface thereof, and a torque shoulder portion 9 on an end surface thereof. The box 2 which opposedly faces the pins 1 is a portion which has internally-threaded portions 3, a metal touch seal portion 8 and a torque shoulder portion 10 on an inner surface thereof, and these portions 3, 8 and 10 are portions being threadedly engaged with or brought into contact with the externally-threaded portion 4, the metal touch seal portion 7 and the torque shoulder portion 9 of the respective pin 1.

As a prior art relating to a premium joint where sealability is improved, for example, patent literature 1 discloses a pipe joint where a radius of curvature of a surface of a seal portion on a pin side and a radius of curvature of a surface of a seal portion on a box side which corresponds to the surface of the seal portion on the pin side are set substantially equal to each other thus decreasing stress concentration when the pin and the box are completely meshed with each other whereby sealing is hard to be broken even when an internal pressure or an external force is applied to the premium joint.

PATENT LITERATURE

PTL 1: JP-A-60-260792

SUMMARY OF THE INVENTION

In the technique described in patent literature 1, however, the surface of the seal portion on a pin side and a box side is divided into three arcs and these arcs have substantially the same radius of curvature. However, positions of the arcs are not explicitly defined so that it is not always the case that a sufficient contact state is ensured at the seal portion during fitting engagement whereby securing of sealability remains as a problem to be solved.

Aspects of the present invention have been made in view of such a drawback, and it is an object according to aspects of the present invention to provide a threaded joint for oil country tubular goods having excellent sealability.

Inventors of the present invention have made extensive studies to overcome the above-mentioned drawback, and have made the following finding.

In accordance with aspects of the present invention, it has been found that by setting difference in radius of curvature between a portion of an arc of an annular outer peripheral surface portion which forms a seal portion of a pin and a portion of an arc of an annular inner peripheral surface portion which forms a seal portion of a box to a value which falls within a predetermined range and, at the same time, by making a center position of the portion of the arc of the annular outer peripheral surface portion which forms the seal portion of the pin and a center portion of the portion of the arc of the annular inner peripheral surface portion which forms the seal portion of the box close to each other such that a difference in pipe axial direction distance between the center positions becomes 2 mm or less, sealability can be largely enhanced.

Aspects of the present invention have been made based on the above-mentioned finding, and are as follows.

[1] A threaded joint for oil country tubular goods including:

a pin having an annular outer peripheral surface portion formed on a tip end side of a steel pipe, and an externally-threaded portion formed from the annular outer peripheral surface portion toward a center of a steel pipe in an axial direction of the steel pipe; and a box having a cavity in which the pin is housed, wherein an internally-threaded portion which threadedly engages with the externally-threaded portion and an annular inner peripheral surface portion which is brought into contact with and abuts against the annular outer peripheral surface portion are formed in the cavity, wherein the pin and the box are joined to each other due to threaded engagement between the externally-threaded portion and the internally-threaded portion so that the annular outer peripheral surface portion and the annular inner peripheral surface portion are brought into contact with each other and a contact portion between the annular outer peripheral surface portion and the annular inner peripheral surface portion forms a seal portion, wherein the annular outer peripheral surface portion which forms the seal portion of the pin is formed into a projecting arc shape, and the annular inner peripheral surface portion which forms the seal portion of the box is formed into a recessed arc shape, a difference in radius of curvature between an arc of the annular outer peripheral surface portion of the pin and an arc of the annular inner peripheral surface portion of the box is set to a value which falls within a range of ±10%, and a difference in pipe axial direction distance between a center position of the arc of the annular outer peripheral surface portion of the pin and a center position of the arc of the annular inner peripheral surface portion of the box is set to 2 mm or less.

[2] The threaded joint for oil country tubular goods described in [1], wherein the difference in pipe axial direction distance between the center position of the arc of the annular outer peripheral surface portion of the pin and the center position of the arc of the annular inner peripheral surface portion of the box is set to 1 mm or less.

[3] The threaded joint for oil country tubular goods described in [1] or [2], wherein the seal portion and a shoulder portion of the pin are connected with each other by an arc smaller than the arc of the annular outer peripheral surface portion, and the seal portion and a shoulder portion of the box are connected with each other by an arc smaller than the arc of the annular inner peripheral surface portion.

In accordance with aspects of the present invention, "having excellent sealability" means that when a sealability evaluation test is performed in accordance with ISO13679: 2002, a leak does not occur even when a compressive stress of 80% or more is applied.

According to aspects of the present invention, it is possible to acquire a threaded joint for oil country tubular goods having excellent sealability.

BRIEF DESCRIPTION OF THE DRAWINGS

FIG. 1A, FIG. 1B and FIG. 10 are cross-sectional views of a threaded joint for oil country tubular goods in a joint form for describing one example of an embodiment of the present invention, wherein FIG. 1A is a cross-sectional view along a pipe axial direction, FIG. 1B is an enlarged cross-sectional view of a part of a seal portion and an area in the vicinity of the seal portion in the course of joining, and FIG. 10 is an enlarged cross-sectional view of the part of the seal portion and the area in the vicinity of the seal portion after joining.

FIG. 2A, FIG. 2B and FIG. 2C are enlarged cross-sectional views of a part of a seal portion and an area in the vicinity of the seal portion in FIG. 1A, wherein FIG. 2A is an enlarged cross-sectional view showing a nose portion and an area in the vicinity of the nose portion, FIG. 2B is an enlarged cross-sectional view of a box showing the seal portion and an area around the seal portion, and FIG. 2C is an enlarged cross-sectional view of a pin showing the seal portion and the area around the seal portion.

FIG. 3A, FIG. 3B and FIG. 3C are cross-sectional views showing one example of a conventional threaded joint for pipes, wherein FIG. 3A is a cross-sectional view along a pipe axial direction, FIG. 3B is an enlarged cross-sectional view showing a seal and an area around the seal after joining, and FIG. 3C is an enlarged cross-sectional view showing a threaded portion after joining.

DETAILED DESCRIPTION OF EMBODIMENTS OF THE INVENTION

Figure 1:
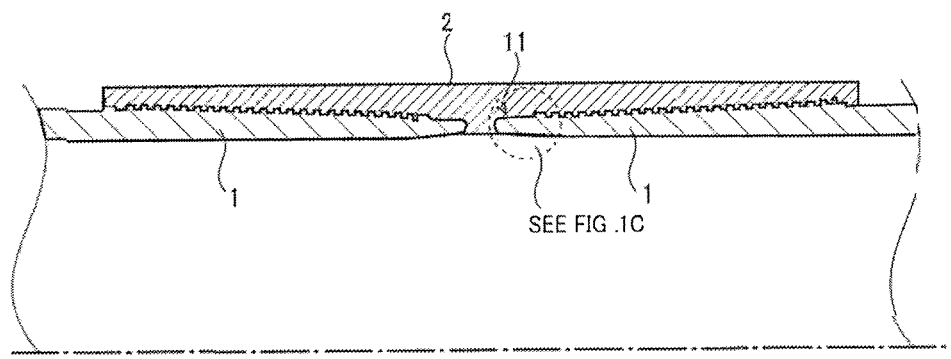
Figure 1:
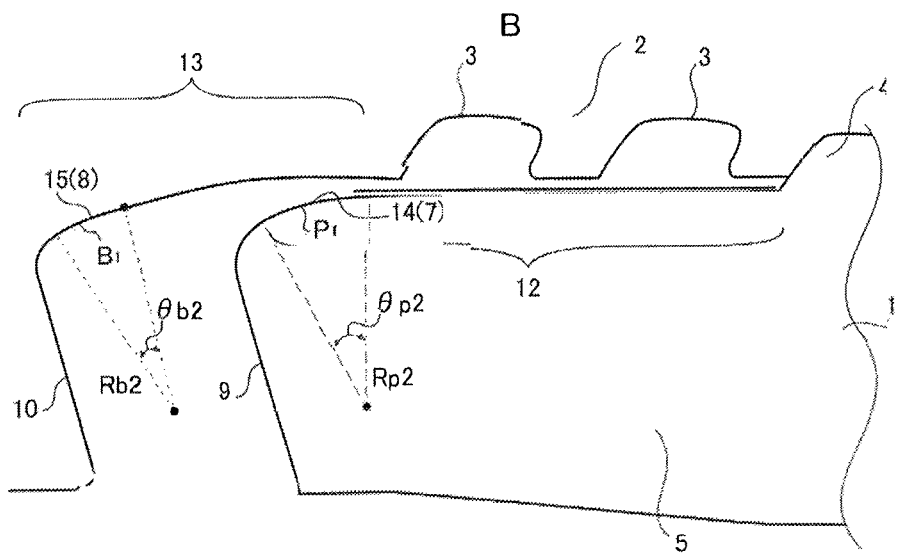
Figure 1:
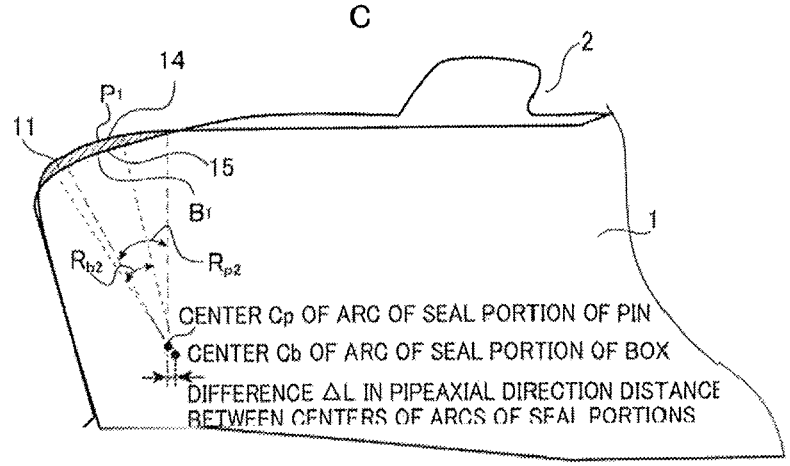

Embodiments of the present invention are described in detail hereinafter. FIG. 1A, FIG. 1B and FIG. 10 are cross-sectional views of a threaded joint for oil country tubular goods for describing one example of an embodiment of the present invention, wherein FIG. 1A is a cross-sectional view along a pipe axial direction, FIG. 1B is an enlarged cross-sectional view of a part of a seal portion and an area in the vicinity of the seal portion in the course of joining, and FIG. 10 is an enlarged cross-sectional view of the part of the seal portion and the area in the vicinity of the seal portion after joining.

The threaded joint for oil country tubular goods in accordance with aspects of the present invention is, for example, a threaded joint for steel pipes where pins 1 and a box 2 are joined to each other by threaded joining as shown in FIG. 1A and FIG. 1B. The pin 1 includes an externally-threaded portion 4 and a nose portion 5 extending from the externally-threaded portion 4 toward a pipe end side. The nose portion 5 has a shoulder portion 9 formed on a tip end, and a seal portion 7 formed adjacently to the shoulder portion 9. The box 2 has a cavity in which the pin is housed. The box 2 has an internally-threaded portion 3 which is threadedly joined to the externally-threaded portion 4 and forms a threaded portion, a seal portion 8 which opposedly faces the seal portion 7 of the pin 1, and a shoulder portion 10 which is brought into contact with the shoulder portion 9 of the pin 1. In accordance with aspects of the present invention, an annular outer peripheral surface portion 12 is formed on the pin 1 on a tip end side of a steel pipe, and an annular inner peripheral surface portion 13 which is brought into contact with and abuts against the annular outer peripheral surface portion is formed on the box 2 which opposedly faces the pin 1. The pin 1 and the box 2 are joined to each other by threaded joining so that the seal portion 7 of the pin 1 and the seal portion 8 of the box 2 are brought into metal-to-metal contact and a contact portion forms a seal portion 11.

In accordance with aspects of the present invention, as shown in FIG. 1C, in the threaded joint, a radius of curvature of an arc of the annular outer peripheral surface portion 12 of the pin 1 and a radius of curvature of an arc of the annular inner peripheral surface portion 13 of the box 2 are set substantially equal to each other, and a pipe axial direction distance ΔL between a center position ($C_p$) of the arc $P_1$ (14) of the annular outer peripheral surface portion which forms the seal portion 11 of the pin 1 (hereinafter, also referred to as the arc which forms the seal portion of the pin) and a center position ($C_b$) of the arc $B_1$ (15) of the annular inner peripheral surface portion which forms the seal portion 11 of the box 2 (hereinafter, also referred to as the arc which forms the seal portion of the box) are made close to each other. In this embodiment, the arc which forms the seal portion is an arc of a portion having the largest interference amount (a width of a hatched portion in FIG. 1C and FIG. 2A).

By forming the annular outer peripheral surface portion which forms the seal portion 11 of the pin 1 into a projecting arc shape and by forming the annular inner peripheral surface portion 13 which forms the seal portion 11 of the box 2 which opposedly faces the annular outer peripheral surface portion 12 into a recessed arc shape, a contact length can be increased by a complementary contact. As a result, sealability can be enhanced.

To acquire the above-mentioned sealability enhancing effect, the difference (($R_{p2}-R_{b2}$)/$R_{p2}\times 100$) between the radius of curvature $R_{p2}$ of the arc $P_1$ (14) of the annular outer peripheral surface portion of the pin 1 and the radius of curvature $R_{b2}$ of the arc $B_1$ (15) of the annular inner peripheral surface portion of the box 2 is set to a value which falls within a range of ±10%.

On the other hand, when the difference exceeds ±10%, the contact length of the seal portion cannot be sufficiently ensured and hence, the sealability to which aspects of the present invention aim at cannot be ensured.

To bring the projecting arc $P_1$ (14) of the annular outer peripheral surface portion which forms the seal portion 11 of the pin 1 and the recessed arc $B_1$ (15) of the annular inner peripheral surface portion which forms the seal portion 11 of the box 2 into contact with each other with a sufficient contact length, in addition to the above-mentioned condition, it is necessary to make the center position $C_p$ of the arc $P_1$ (14) of the pin 1 which forms the seal portion 11 and the center position $C_b$ of the arc $B_1$ (15) of the box 2 which forms the seal portion 11 close to each other at the pipe axial direction position. In view of the above, the inventors of the present invention have made extensive studies for making the center position $C_p$ of the arc $P_1$ (14) of the pin 1 which forms the seal portion 11 and the center position $C_b$ of the arc $B_1$ (15) of the box 2 close to each other with a difference ΔL in the pipe axial direction distance. As a result, it is found that sealability can be enhanced by making the center position $C_p$ of the arc $P_1$ of the pin and the center position $C_b$ of the arc $B_1$ of the box close to each other with the difference ΔL in the pipe axial direction distance of 2 mm or less. It is preferable that the difference ΔL in pipe axial direction distance between the center position $C_p$ of the arc $P_1$ of the pin and the center position $C_b$ of the arc $B_1$ of the box be set to 1 mm or less. On the other hand, when the difference ΔL in pipe axial direction distance between the center position $C_p$ of the arc $P_1$ of the pin and the center position $C_b$ of the arc $B_1$ of the box is set to more than 2 mm, the arcs are not snugly brought into contact with each other so that a non-uniform contact is generated whereby a sufficient contact length cannot be ensured whereby sealability cannot be ensured.

Figure 2:
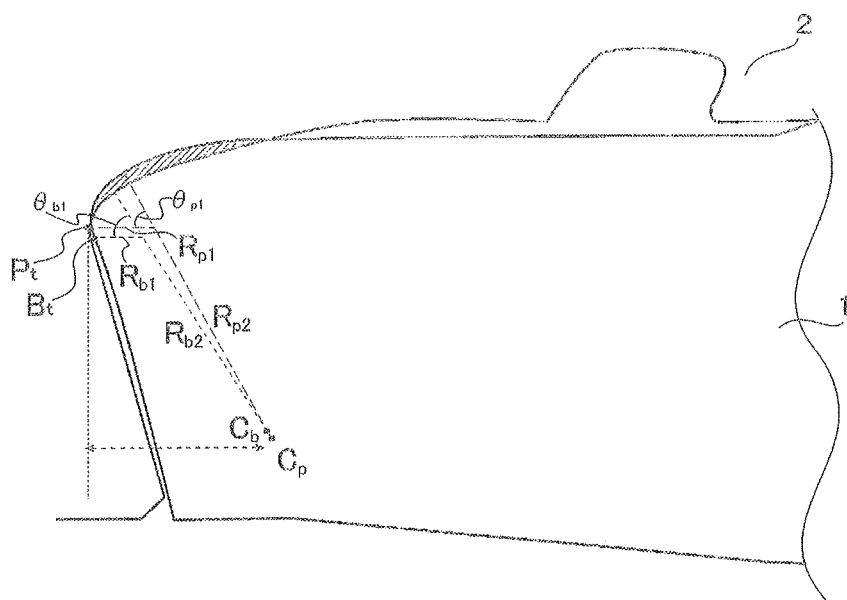
Figure 2:
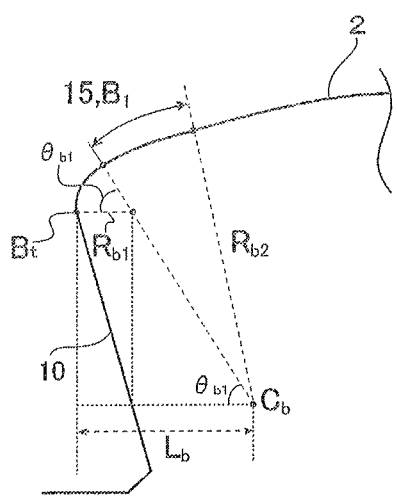
Figure 3:
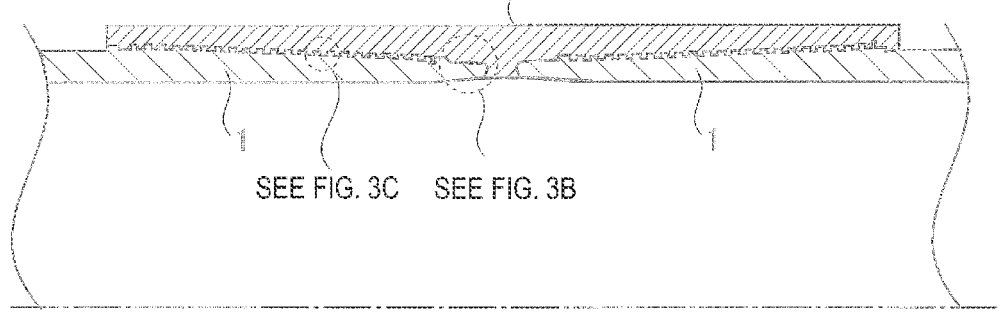
Figure 3:
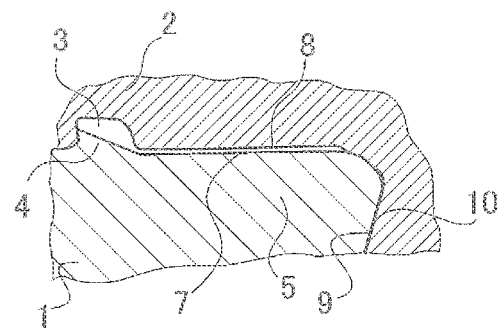
Figure 3:
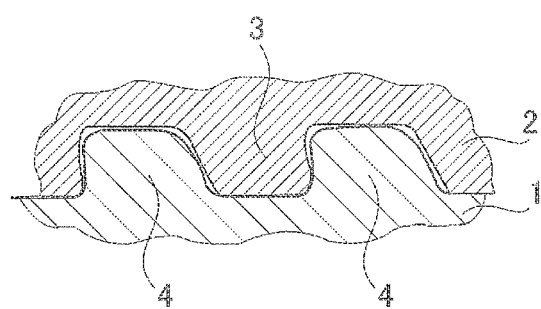

The center position ($C_p$) of the arc $P_1$ of the annular outer peripheral surface portion which forms the seal portion of the pin and the center position ($C_b$) of the arc $B_1$ of the annular inner peripheral surface portion which forms the seal portion of the box are described. FIG. 2A, FIG. 2B and FIG. 2C are enlarged cross-sectional views of a part of the seal portion and an area in the vicinity of the seal portion in FIG. 1A. These drawings show a design example of the case where the seal portion and the shoulder portion are connected with each other by one small arc.

As shown in FIG. 2A, FIG. 2B and FIG. 2C, the center position ($C_p$) of the arc $P_1$ of the annular outer peripheral surface portion which forms the seal portion of the pin is expressed by a distance $L_p$ from a tip end $P_t$ of the pin 1 to the center position $C_p$ of the arc $P_1$ (14) of the annular outer peripheral surface portion. The center position ($C_b$) of the arc $B_1$ of the annular inner peripheral surface portion which forms the seal portion of the box is expressed by a distance $L_b$ from a tip end $B_t$ of the box 2 to the center position $C_b$ of the arc $B_1$ (15) of the annular inner peripheral surface portion.

In performing threaded joining, with respect to the positions of the pin and the box, the axial direction positions of the pin and the box are substantially decided at the position where the shoulder faces 9 and 10 abut each other and hence, the tip end $P_t$ of the pin 1 and a deep end $B_t$ of the box 2 become initiation points of elastic deformation. Accordingly, the distances $L_p$ and $L_b$ from the tip end $P_t$ of the pin 1 and from the deep end $B_t$ of the box 2 to the center positions $C_p$ and $C_b$ of the respective arcs become important. The closer the center positions $C_b$ and $C_p$ of the respective arcs become, it is possible to bring the seal portions into contact with each other with a sufficient contact length and hence, the closer positions of $C_b$ and $C_p$ are important conditions in accordance with aspects of the present invention. Accordingly, the center positions of the arcs which form the seal portions of the pin and the box are designed so as to satisfy the formulae (1) to (3).

$$L_b = R_{b1} + (R_{b2} - R_{b1}) \times \cos \theta_{b1} \qquad (1)$$

$$L_p = R_{p1} + (R_{p2} - R_{p1}) \times \cos \theta_{p1} \qquad (2)$$

$$\Delta L = |L_b - L_p| \leq 2 \text{ mm} \qquad (3)$$

In the above-mentioned formulae, $L_b$: pipe axial direction distance from center position $C_b$ of arc which forms seal portion of box to deep end $B_t$ of box $L_p$: pipe axial direction distance from center position $C_p$ of arc which forms seal portion of pin to tip end $P_t$ of pin $\Delta L = |L_b - L_p|$: difference in pipe axial direction distance between center positions $C_b$ and $C_p$ of arcs which form seal portions of box and pin $R_{b1}$: radius of small arc which connects seal portion 15 and shoulder portion 10 of box to each other $R_{b2}$: radius of arc $B_1$ which forms seal portion 15 of box $R_{p1}$: radius of small arc which connects seal portion 14 and shoulder portion of pin 9 to each other $R_{p2}$: radius of arc $P_1$ which forms seal portion 14 of pin $\theta_{b1}$: center angle of small arc which connects seal portion 15 and shoulder portion 10 of box $\theta_{p1}$: center angle of small arc which connects seal portion 14 and shoulder portion 9 of pin It is preferable that the radii $R_{b2}$ and $R_{p2}$ of the arcs of the seal portions be set to 4 mm or more and 30 mm or less. When a value of the radius is excessively small, a contact length of the seal portion becomes insufficient and hence, sealability cannot be ensured. On the other hand, when the value of the radius is excessively large, the threaded joint cannot be designed unless a nose length is elongated extremely. In this case, the excessively elongated nose lowers rigidity of the pin and hence, a sufficient face pressure cannot be ensured whereby sealability cannot be ensured.

Example 1

Hereinafter, the present invention is described in detail with reference to an example. The present invention is not limited to the following example.

In a steel type Q125 of API 5CT having an outer diameter of 9⅝ inches and a wall thickness of 0.545 inches (outer diameter: 244.48 mm, wall thickness: 13.84 mm), threaded joints each of which is formed of pins having dimensions on respective levels shown in Table 1 and a box which corresponds to (fitting engagement) were designed and manufactured. The design was made such that a seal portion and a shoulder portion are connected to each other by one small arc as shown in FIG. 2A, FIG. 2B and FIG. 2C.

A sealability evaluation test was carried out on these threaded joints in accordance with ISO13679:2002. Test difficulty was set to CAL IV and one sample #5 was used as a test sample. In accordance with aspects of the present invention, it is determined that the test sample acquires a score "good" in a sealability evaluation test when a leak does not occur even when a compressive stress of 80% or more is applied to a 95% load curved surface of VME calculated based on a yield strength of a steel type Q125 of API 5CT. A result obtained by the test is also shown in Table 1.

excellent sealability. On the other hand, all threaded joints for oil country tubular goods which do not fall within the scope of the present invention (levels No. 5 to No. 8: comparison examples) exhibited inferior sealability.

From the above, it is found that, by designing the threaded joint for oil country tubular goods such that the difference in radius of curvature between the arc $P_1$ of the pin and the arc $B_1$ of the box 2 falls within ±10% and the pipe axial direction distance difference $\Delta L$ between the center position of the arc which forms the seal portion of the pin and the center position of the arc which forms the seal portion of the box falls within ±2 mm, the joint having excellent sealability can be realized.

TABLE 1

| Level No. | Seal portion (projecting arc) of pin Radius of arc: $R_{p2}$ (mm) | Seal portion (recessed arc) of box Radius of arc: $R_{b2}$ (mm) | Difference in radius of curvature of seal arc (%) | Radius of tip end arc of pin: $R_{p1}$ (mm) | Radius of deep end arc of box: $R_{b1}$ (mm) | Center angle of tip end arc of pin: $\theta_{p1}$ (°) |
|---|---|---|---|---|---|---|
| 1 | 5.08 | 5.21 | 2.5 | 2.5 | 0.8 | 60 |
| 2 | 25.4 | 27.94 | 10.0 | 2.0 | 1.0 | 60 |
| 3 | 12.83 | 12.7 | 1.0 | 1.1 | 1.0 | 58 |
| 4 | 5.08 | 5.08 | 0.0 | 1.5 | 1.4 | 70 |
| 5 | 5.08 | 5.69 | 12.0 | 3.0 | 0.5 | 55 |
| 6 | 12.7 | 10.8 | 15.0 | 1.8 | 1.0 | 65 |
| 7 | 25.4 | 28.45 | 12.0 | 1.2 | 1.0 | 62 |
| 8 | 5.08 | 5.08 | 0.0 | 4.0 | 0.5 | 50 |

| Level No. | Center angle of deep end arc of box: $\theta_{b1}$ (°) | Difference in pipe axial direction distance between center positions of seal arcs $\Delta L$ (mm) | Test result Sealability evaluation test | Remarks |
|---|---|---|---|---|
| 1 | 70 | 1.5 mm | Good in seal test at compressive stress which is 80% of yield strength | Present invention example |
| 2 | 57 | 2.0 mm | Good in seal test at compressive stress which is 80% of yield strength | Present invention example |
| 3 | 60 | 0.5 mm | Good in seal test at compressive stress which is 100% of yield strength | Present invention example |
| 4 | 50 | 1.0 mm | Good in seal test at compressive stress which is 100% of yield strength | Present invention example |
| 5 | 65 | 1.5 mm | Leak occurred during seal test | Comparison example |
| 6 | 60 | 0.5 mm | Leak occurred during seal test | Comparison example |
| 7 | 60 | 2.2 mm | Leak occurred during seal test | Comparison example |
| 8 | 75 | 3.0 mm | Leak occurred during seal test | Comparison example |

As shown in Table 1, in threaded joints for oil country tubular goods according to aspects of the present invention (levels No. 1 to 4: present invention examples), at all levels, a leak did not occur even when a compressive stress of 80% or more was applied to a 95% load curved surface of VME calculated based on a yield strength of steel type Q125 of API 5CT. Accordingly, the threaded joints for oil country tubular goods acquired score "good" in the sealability evaluation test. Particularly, when the pipe axial direction distance difference $\Delta L$ between the center positions of the arcs which form the seal portions of the box and the pin is set to 1 mm or less (levels No. 3 and No. 4), leak did not occur even when a compressive stress of 100% was applied to a 95% load curved surface of VME calculated based on a yield strength of steel type Q125 of API 5CT and hence, the threaded joints for oil country tubular goods acquired score "good" in the seal test. From this result, it is found that such threaded joints for oil country tubular goods have most

REFERENCE SIGNS LIST

1: pin
2: box
3: internally-threaded portion
4: externally-threaded portion
5: nose portion
7, 8: metal touch seal portion
9, 10: shoulder portion (torque shoulder portion)
11: seal portion
12: annular outer peripheral surface portion
13: annular inner peripheral surface portion
14: arc $P_1$ of annular outer peripheral surface portion which forms seal portion
15: arc $B_1$ of annular inner peripheral surface portion which forms seal portion

The invention claimed is:

1. A threaded joint for oil country tubular goods comprising:
    a pin having an annular outer peripheral surface portion formed on a tip end side of a steel pipe, and an externally-threaded portion formed from the annular outer peripheral surface portion toward a center of a steel pipe in an axial direction of the steel pipe; and
    a box having a cavity in which the pin is housed, wherein an internally-threaded portion which threadedly engages with the externally-threaded portion and an annular inner peripheral surface portion which is brought into contact with and abuts against the annular outer peripheral surface portion are formed in the cavity, wherein
    the pin and the box are joined to each other due to threaded engagement between the externally-threaded portion and the internally-threaded portion so that the annular outer peripheral surface portion and the annular inner peripheral surface portion are brought into contact with each other and a contact portion between the annular outer peripheral surface portion and the annular inner peripheral surface portion forms a seal portion, wherein
    the annular outer peripheral surface portion which forms the seal portion of the pin is formed into a projecting arc shape, and the annular inner peripheral surface portion which forms the seal portion of the box is formed into a recessed arc shape,
    a difference in radius of curvature between an arc of the annular outer peripheral surface portion of the pin and an arc of the annular inner peripheral surface portion of the box is set to a value which falls within a range of ±10%,
    in a joined state of the pin and the box, a difference in pipe axial direction distance between a center position of the arc of the annular outer peripheral surface portion of the pin and a center position of the arc of the annular inner peripheral surface portion of the box is set to 2 mm or less, and
    wherein the difference in pipe axial direction distance between the center position of the arc of the annular outer peripheral surface portion of the pin and the center position of the arc of the annular inner peripheral surface portion of the box is set to satisfy the formulae (1) to (3), $$L_b = R_{b1} + (R_{b2} - R_{b1}) \times \cos\theta_{b1} \quad (1)$$

$$L_p = R_{p1} + (R_{p2} - R_{p1}) \times \cos\theta_{p1} \quad (2)$$

$$\Delta L = |L_b - L_p| \leq 2 \text{ mm} \quad (3)$$

where:
    $L_b$: pipe axial direction distance from the center position of the arc which forms the seal portion of box to a deep end of the box;
    $L_p$: pipe axial direction distance from the center position of the arc which forms the seal portion of pin to a tip end of the pin;
    $\Delta L = |L_b - L_p|$: difference in the pipe axial direction distance between the center positions of the arcs which form the seal portions of the box and the pin;
    $R_{b1}$: radius of a small arc which connects the seal portion and a shoulder portion of the box to each other;
    $R_{b2}$: radius of an arc which forms the seal portion of the box;
    $R_{p1}$: radius of a small arc which connects the seal portion and a shoulder portion of the pin to each other;
    $R_{p2}$: radius of an arc which forms the seal portion of the pin;
    $\theta_{b1}$: center angle of the small arc which connects the seal portion and the shoulder portion of the box; and
    $\theta_{p1}$: center angle of the small arc which connects the seal portion and the shoulder portion of the pin.

2. The threaded joint for oil country tubular goods according to claim 1, wherein the difference in pipe axial direction distance between the center position of the arc of the annular outer peripheral surface portion of the pin and the center position of the arc of the annular inner peripheral surface portion of the box is set to 1 mm or less.

3. The threaded joint for oil country tubular goods according to claim 1, wherein the seal portion and a shoulder portion of the pin are connected with each other by one arc smaller than the arc of the annular outer peripheral surface portion, and the seal portion and a shoulder portion of the box are connected with each other by one arc smaller than the arc of the annular inner peripheral surface portion.

4. The threaded joint for oil country tubular goods according to claim 2, wherein the seal portion and a shoulder portion of the pin are connected with each other by one arc smaller than the arc of the annular outer peripheral surface portion, and the seal portion and a shoulder portion of the box are connected with each other by one arc smaller than the arc of the annular inner peripheral surface portion.

5. The threaded joint for oil country tubular goods according to claim 1, wherein the difference in radius of curvature between the arc of the annular outer peripheral surface portion of the pin and the arc of the annular inner peripheral surface portion of the box is ±1% or more.

6. The threaded joint for oil country tubular goods according to claim 1, wherein a tip end of the pin and a deep end of the box become initiation points of elastic deformation when threaded joining is performed.

* * * * *